United States Patent
Chou

(10) Patent No.: US 11,320,726 B2
(45) Date of Patent: May 3, 2022

(54) SHOCK ABSORBER AND PROJECTION DEVICE

(71) Applicant: Coretronic Corporation, Hsin-Chu (TW)

(72) Inventor: Chih-Cheng Chou, HsinChu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/214,944

(22) Filed: Mar. 29, 2021

(65) Prior Publication Data

US 2021/0389650 A1 Dec. 16, 2021

(30) Foreign Application Priority Data

Jun. 16, 2020 (CN) .......................... 202021106273.1

(51) Int. Cl.
*G03B 21/14* (2006.01)

(52) U.S. Cl.
CPC .................................. *G03B 21/145* (2013.01)

(58) Field of Classification Search
CPC ....... G03B 21/00; G03B 21/14; G03B 21/145
USPC .................................................... 353/84, 119
See application file for complete search history.

(56) References Cited

U.S. PATENT DOCUMENTS 6,914,734 B1 * 7/2005 Kao ..................... G02B 26/008
356/418
7,453,667 B2 * 11/2008 Cho ..................... G11B 25/043
7,839,584 B2 * 11/2010 Metelski ............ G02B 21/0012
359/823
7,926,955 B2 * 4/2011 Lu .......................... G03B 21/54
348/743
8,189,099 B2 * 5/2012 Kawai .................. G03B 21/145
348/241
8,622,553 B2 * 1/2014 Chuang ................ H04N 9/3161
248/560
2020/0401027 A1 * 12/2020 Zhao ..................... G03B 21/16

FOREIGN PATENT DOCUMENTS

CN 102411183 4/2012
TW M494257 1/2015

* cited by examiner

*Primary Examiner* — William C. Dowling
(74) *Attorney, Agent, or Firm* — JCIPRNET

(57) ABSTRACT

A shock absorber, including a first casing, a second casing, a frame, a vibrator, and a buffer element, is provided. The first casing includes a first pressing portion. The second casing is detachably fixed to the first casing and includes a second pressing portion. The frame includes a first portion and a second portion, and the first portion is located between the first pressing portion and the second pressing portion. The vibrator is fixed to the second portion of the frame. The buffer element is disposed between the first pressing portion and the first portion of the frame, and between the second pressing portion and the first portion of the frame. The first pressing portion and the second pressing portion press against the buffer element to sandwich the first portion of the frame. A projection device with the shock absorber is also provided.

16 Claims, 3 Drawing Sheets

SHOCK ABSORBER AND PROJECTION DEVICE

CROSS-REFERENCE TO RELATED APPLICATION

This application claims the priority benefit of China application serial no. 202021106273.1, filed on Jun. 16, 2020. The entirety of the above-mentioned patent application is hereby incorporated by reference herein and made a portion of this specification.

BACKGROUND

Technical Field

This disclosure relates to a shock absorber and a projection device.

Description of Related Art

Currently, many projectors are disposed with a color wheel and rotate the color wheel to carry out color mixing of the three primary colors of red, blue, and green so as to generate a picture. The color wheel is generally fixed on a frame made of sheet metal by the manner of locking, and then screws are used to lock the frame with the casing of the optical machine. Because the color wheel will generate vibration when it is rotating, the vibration will be transmitted to the casing of the optical machine by the frame. In addition to causing the casing to vibrate which may have an impact on the optical elements accommodated in the casing, it also generates a lot of noise.

The information disclosed in this background section is only for enhancement of understanding of the background of the described technology and therefore it may contain information that does not form the prior art that is already known to a person of ordinary skill in the art. Furthermore, the information disclosed in the background section does not mean that one or more problems to be resolved by one or more embodiments of the disclosure were acknowledged by a person of ordinary skill in the art.

SUMMARY

This disclosure provides a shock absorber, which reduces the probability of vibration being transmitted to a casing, thereby providing shock absorption and noise reduction.

The disclosure provides a projection device with the shock absorber.

The shock absorber of the disclosure includes a first casing, a second casing, a frame, a vibrator, and a buffer element. The first casing includes a first pressing portion. The second casing is detachably fixed to the first casing and includes a second pressing portion. The frame includes a first portion and a second portion, and the first portion is located between the first pressing portion and the second pressing portion. The vibrator is fixed to the second portion of the frame. The buffer element is disposed between the first pressing portion and the first portion of the frame, and between the second pressing portion and the first portion of the frame. The first pressing portion and the second pressing portion press against the buffer element, and sandwich the first portion of the frame.

The projection device of the disclosure includes a first optical machine casing, a second optical machine casing, a frame, a wheel and a buffer element. The first optical machine casing includes a first pressing portion. The second optical machine casing is detachably fixed to the first optical machine casing and includes a second pressing portion. The frame includes a first portion and a second portion, and the first portion is located between the first pressing portion and the second pressing portion. The wheel is fixed to the second portion of the frame. The buffer element is disposed between the first pressing portion and the first portion of the frame, and between the second pressing portion and the first portion of the frame. The first pressing portion and the second pressing portion press against the buffer element, and sandwich the first portion of the frame.

Based on the above, the shock absorber of the disclosure disposes the buffer element between the first pressing portion and the first portion of the frame, and between the second pressing portion and the first portion of the frame, and the first pressing portion of the first casing and the second pressing portion of the second casing press the buffer element to sandwich the first portion of the frame so as to fix the relative positions of the frame, the first casing and the second casing. With the foregoing configuration, the buffer element may provide buffering to the portion between the frame and the first casing, and the portion between the frame and the second casing, so as to provide good shock absorption and noise reduction.

Other objectives, features and advantages of the disclosure can be further understood from the further technological features disclosed by the embodiments of the disclosure wherein there are shown and described preferred embodiments of the disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the descriptions, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top", "bottom", "front", "back" etc., is used with reference to the orientation of the figure(s) being described. The components of the disclosure can be positioned in a number of different orientations. As such, the directional terminology is used for purposes of illustration and is in no way limiting.

On the other hand, the drawings are only schematic and the size of the components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting.

The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings.

Similarly, the terms "facing", "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
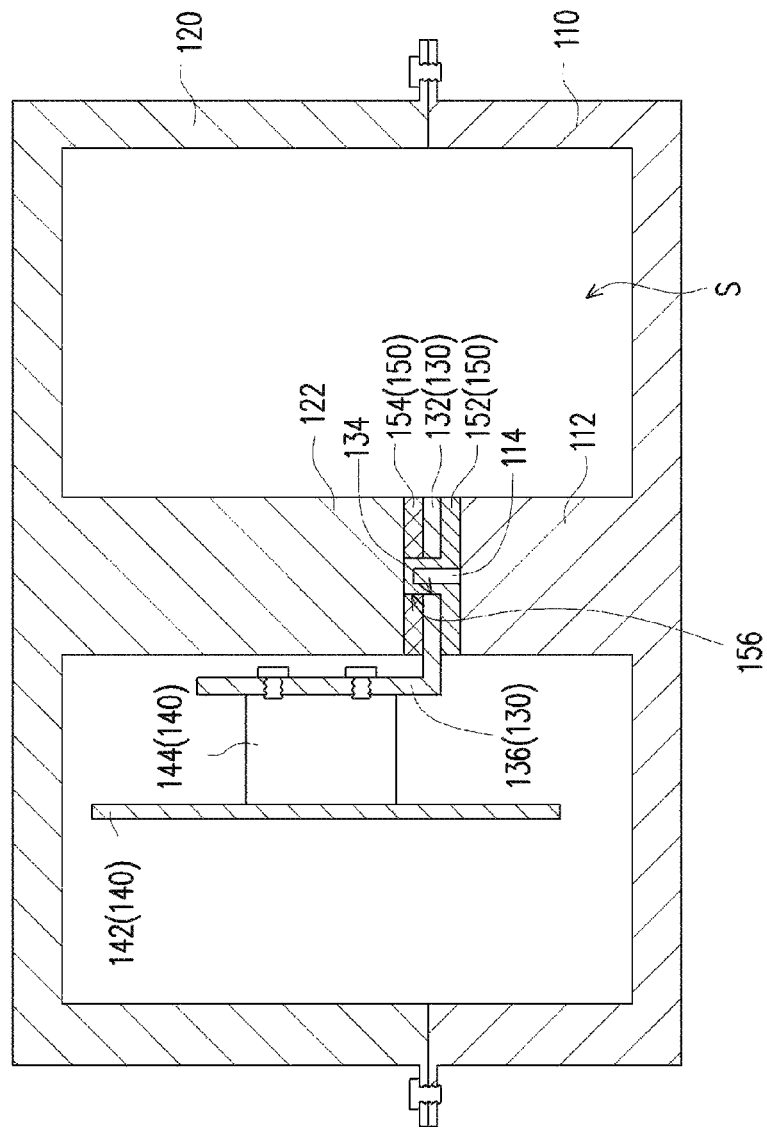
FIG. 1 is a schematic diagram of a projection device according to an embodiment of the disclosure.

FIG. 1 is a schematic diagram of a projection device according to an embodiment of the disclosure. With reference to FIG. 1, a shock absorber 100 of the embodiment includes a first casing 110, a second casing 120, a frame 130, a vibrator 140, and a buffer element 150. In the embodiment, the shock absorber 100 is applied to an optical machine of a projection device 10. Therefore, the first casing 110 is, for example, a first optical machine casing, and the second casing 120 is, for example, a second optical machine casing. The vibrator 140 includes a wheel 142 (for example, a color wheel or a fluorescent wheel) of the projection device 10 and a motor 144 that rotates the wheel 142, but the types of devices and foregoing components to which the shock absorber 100 is applied are not limited thereto.

In the embodiment, the second casing 120 is detachably fixed to the first casing 110. The first casing 110 and the second casing 120 are, for example, locked by screws or fastened by fasteners to fix the relative positions thereof. The first casing 110 and the second casing 120 together surround a space S. The first casing 110 includes a first pressing portion 112, and the second casing 120 includes a second pressing portion 122. In the embodiment, the first pressing portion 112 of the first casing 110, the second pressing portion 122 of the second casing 120, the wheel 142 and the motor 144 of the vibrator 140, and the frame 130 are located in the space S.

The frame 130 is a component that fixes the vibrator 140 to the first casing 110 or/and the second casing 120. In the embodiment, the frame 130 includes a first portion 132 and a second portion 136. The first portion 132 is located between the first pressing portion 112 and the second pressing portion 122. The vibrator 140 is fixed to the second portion 136 of the frame 130. Specifically, in the embodiment, the wheel 142 of the vibrator 140 is rotatably disposed on the motor 144, and the motor 144 is locked on the second portion 136 of the frame 130, so that the wheel 142 can rotate relative to the frame 130.

When the vibrator 140 is operating, the vibration of the vibrator 140 is transmitted to the frame 130 fixed to the vibrator 140. Since the frame 130 is connected to the first casing 110 or/and the second casing 120, the vibration may be transmitted to the first casing 110 or/and the second casing 120, and affect the optical performance. In the embodiment, the shock absorber 100 has a special buffer design to reduce the probability that the vibration generated during the operation of the vibrator 140 is transmitted to the first casing 110 or/and the second casing 120, correspondingly reducing the noise caused by the vibration.

In detail, in the embodiment, the buffer element 150 is disposed between the first pressing portion 112 and the first portion 132 of the frame 130, and between the second pressing portion 122 and the first portion 132 of the frame 130. The first pressing portion 112 and the second pressing portion 122 press against the buffer element 150 to sandwich the first portion 132 of the frame 130.

The material of the buffer element 150 includes, for example, rubber, silicone rubber, high/low density foam, etc., but the material of the buffer element 150 is not limited thereto. In other embodiments, the buffer element 150 may also adjust its damping coefficient through parameters such as shape and size. For example, the buffer element 150 may also be a spring.

More specifically, in the embodiment, the buffer element 150 includes a first cushion 152 and a second cushion 154. The first cushion 152 and the second cushion 154 are two rubber pads. The first cushion 152 is disposed between the first pressing portion 112 and the first portion 132 of the frame 130, and the second cushion 154 is disposed between the second pressing portion 122 and the first portion 132 of the frame 130. In other embodiments, the buffer element 150 may also be a single structure disposed between the first pressing portion 112 and the first portion 132 of the frame 130, and between the second pressing portion 122 and the first portion 132 of the frame 130.

In addition, as shown in FIG. 1, the frame 130 includes a first opening 134 located on the first portion 132, and the second cushion 154 has a cushion opening 156. The first pressing portion 112 includes a protruding column 114, which is covered by the first cushion 152 of the buffer element 150, and penetrates the first opening 134 of the first portion 132 of the frame 130 and the cushion opening 156 of the second cushion 154. The protruding column 114 may enable the relative positions between the frame 130 and the first pressing portion 112 to be located quickly and conveniently. In other embodiments, the protruding column 114 may be formed on the second pressing portion 122, or alternatively, the protruding column 114 may be omitted.

In the embodiment, a portion of the first cushion 152 covering the top of the protruding column 114 is slightly lower than or flush with the second cushion 154, so that when the second casing 120 is locked to the first casing 110, the second pressing portion 122 may be pressed against the second cushion 154. In the embodiment, the first pressing portion 112 and the second pressing portion 122 sandwich the first portion 132 of the frame 130 through the first cushion 152 and the second cushion 154, so that the frame 130 may be fixed to the first casing 110 and the second casing 120 by a shock absorbing manner to reduce the noise.

In addition, the buffer element 150 in the embodiment has a simple structure and a convenient configuration. The assembler only has to lay the buffer element 150 between the first pressing portion 112 and the first portion 132 of the frame 130, and between the second pressing portion 122 and the first portion 132 of the frame 130, which is a fairly simple process. In addition, the portion between the first pressing portion 112 and the first portion 132 of the frame 130, and the portion between the second pressing portion 122 and the first portion 132 of the frame 130 are in contact over a large area with the buffer element 150, so that the first portion 132 of the frame 130 may be stably fixed between the first pressing portion 112 and the second pressing portion 122.

Figure 2:
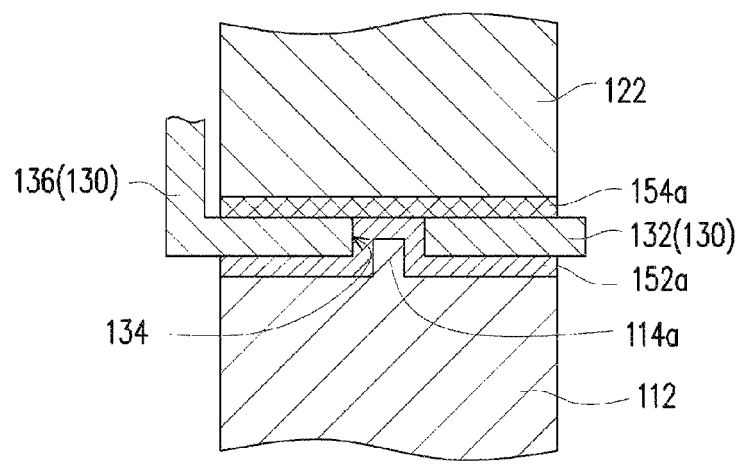
FIG. 2 is a partial schematic diagram of a projection device according to another embodiment of the disclosure.

FIG. 2 is a partial schematic diagram of a projection device according to another embodiment of the disclosure. With reference to FIG. 2, in the embodiment, a protruding column 114a is slightly shorter, so that a portion of a first cushion 152a covering the top of the protruding column 114a is flush with or slightly lower than the frame 130. Therefore, a second cushion 154a may not have the cushion opening 156 (shown in FIG. 1) for the protruding column 114a to pass through.

Similarly, in the embodiment, when the second casing 120 is fixed to the first casing 110, the first pressing portion 112 and the second pressing portion 122 sandwich the first portion 132 of the frame 130 through the first cushion 152a and the second cushion 154a, so that the frame 130 may be fixed to the first casing 110 and the second casing 120 in the shock absorbing manner.

Figure 3:
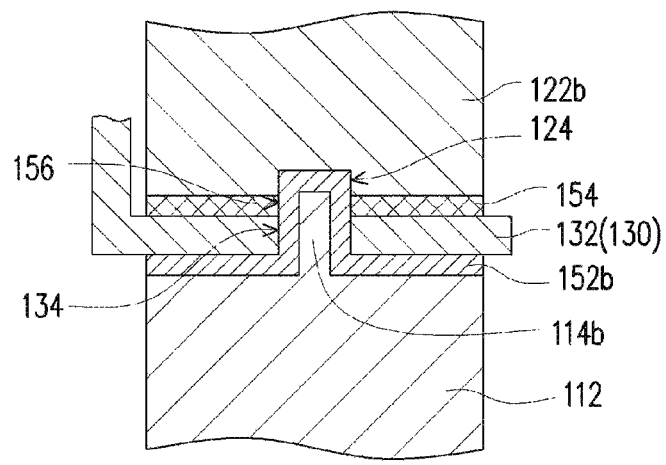
FIG. 3 is a partial schematic diagram of a projection device according to another embodiment of the disclosure.

FIG. 3 is a partial schematic diagram of a projection device according to another embodiment of the disclosure. With reference to FIG. 3, in the embodiment, a protruding column 114b is longer, and a second pressing portion 122b includes a second opening 124. The protruding column 114b is covered by a first cushion 152b of the buffer element 150, and penetrates the first opening 134 of the first portion 132 of the frame 130, the cushion opening 156 of the second cushion 154, and the second opening 124 of the second pressing portion 122b. This design may allow the first pressing portion 112 and the second pressing portion 122 to have a more stable relative positional relationship.

Figure 4:
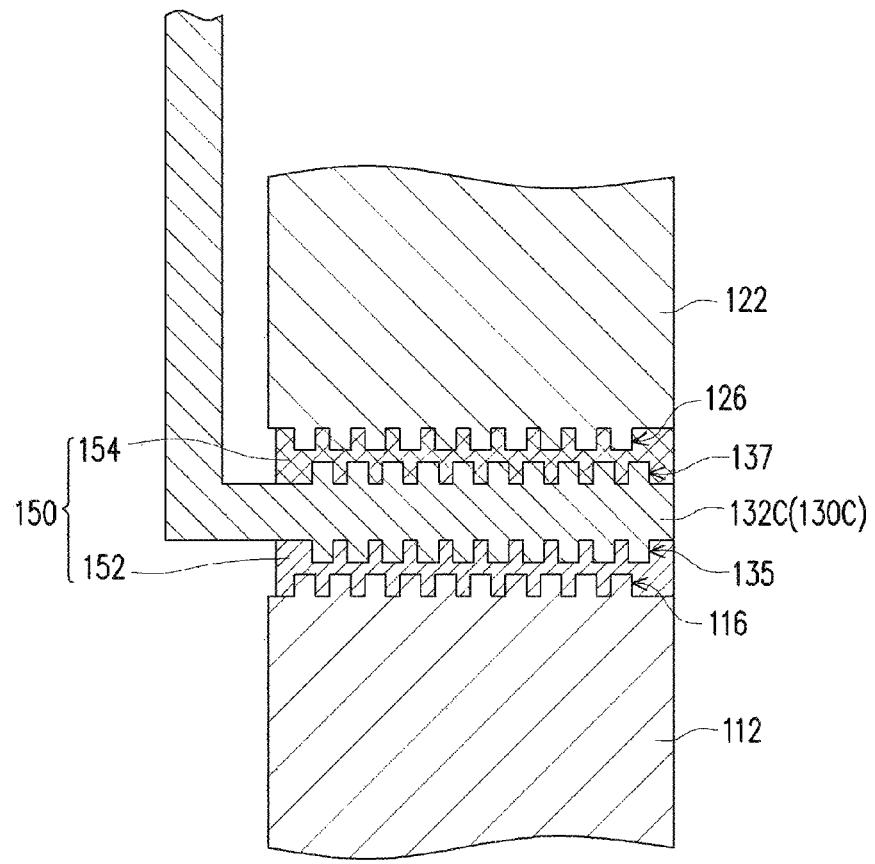
FIG. 4 is a partial schematic diagram of a projection device according to another embodiment of the disclosure.

FIG. 4 is a partial schematic diagram of a projection device according to another embodiment of the disclosure. With reference to FIG. 4, in the embodiment, a first portion 132c of a frame 130c has two first microstructure surfaces 135 and 137 in contact with the buffer element 150. The first microstructure surface 135 faces the first cushion 152 of the buffer element 150, and the first microstructure surface 137 faces the second cushion 154 of the buffer element 150. In other embodiments, the first portion 132c of the frame 130c may only have either the first microstructure surface 135 or the first microstructure surface 137.

The first microstructure surfaces 135 and 137 include, for example, multiple regular or irregular protrusions, but the forms of the first microstructure surfaces 135 and 137 are not limited thereto. The first microstructure surfaces 135 and 137 may increase the friction between the first portion 132c of the frame 130c and the buffer element 150 to reduce the probability that the buffer element 150 moves relative to the first portion 132c of the frame 130c. In other embodiments, the first microstructure surfaces 135 and 137 may also be replaced with first rough surfaces. For example, the first rough surfaces have a scratched or irregular surface, and have a larger friction coefficient.

In addition, in the embodiment, the first pressing portion 112 has a second microstructure surface 116 facing the first portion 132, and the second microstructure surface 116 is in contact with the first cushion 152 of the buffer element 150. The second microstructure surface 116 includes, for example, multiple regular or irregular protrusions, but is not limited thereto. Since the first microstructure surface 135 and the second microstructure surface 116 are in contact with opposite sides of the first cushion 152 of the buffer element 150, the opposite sides of the flexible first cushion 152 follow the shapes of the first microstructure surface 135 and the second microstructure surface 116, and are correspondingly deformed.

The second pressing portion 122 has a third microstructure surface 126 facing the first portion 132c, and the third microstructure surface 126 is in contact with the second cushion 154 of the buffer element 150. The third microstructure surface 126 includes, for example, multiple regular or irregular protrusions, but is not limited thereto. The first microstructure surface 137 and the third microstructure surface 126 are in contact with opposite sides of the second cushion 154 of the buffer element 150, and the opposite sides of the flexible second cushion 154 follow the shapes of the first microstructure surface 137 and the third microstructure surface 126, and are correspondingly deformed. In other embodiments, the first cushion 152 of the buffer element 150 may not be deformed, and is not limited by the drawings.

In the embodiment, the second microstructure surface 116 may increase the friction between the buffer element 150 and the first pressing portion 112, and the third microstructure surface 126 may increase the friction between the buffer element 150 and the second pressing portion 122, so as to reduce the probability that the buffer element 150 moves relative to the first pressing portion 112 and the second pressing portion 122. In other embodiments, the first pressing portion 112 or/and the second pressing portion 122 may also have a second rough surface or/and a third rough surface in contact with the buffer element 150, but is not limited thereto.

In summary, the shock absorber of the disclosure disposes the buffer element between the first pressing portion and the first portion of the frame, and between the second pressing portion and the first portion of the frame. The first pressing portion of the first casing and the second pressing portion of the second casing sandwich the first portion of the frame by pressing against the buffer element to fix the relative positions of the frame, the first casing, and the second casing. With the foregoing configuration, the buffer element may provide buffering between the frame and the first casing, and between the frame and the second casing to provide good shock absorption and noise reduction.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enabling persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the terms "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A shock absorber, comprising a first casing, a second casing, a frame, a vibrator, and a buffer element, wherein:
   the first casing comprises a first pressing portion;
   the second casing is detachably fixed to the first casing, and comprises a second pressing portion;
   the frame comprises a first portion and a second portion, and the first portion is located between the first pressing portion and the second pressing portion;
   the vibrator is fixed to the second portion of the frame; and
   the buffer element is disposed between the first pressing portion and the first portion of the frame, and between the second pressing portion and the first portion of the frame, and the first pressing portion and the second pressing portion press against the buffer element to sandwich the first portion of the frame.

2. The shock absorber according to claim 1, wherein the frame comprises a first opening located on the first portion, the first pressing portion comprises a protruding column, and the protruding column is covered by the buffer element and penetrates the first opening.

3. The shock absorber according to claim 2, wherein the second pressing portion comprises a second opening, and the protruding column extends into the second opening.

4. The shock absorber according to claim 1, wherein the buffer element comprises a first cushion and a second cushion, the first cushion is disposed between the first pressing portion and the first portion of the frame, and the second cushion is disposed between the second pressing portion and the first portion of the frame.

5. The shock absorber according to claim 1, wherein the first portion of the frame has a first rough surface or a first microstructure surface in contact with the buffer element.

6. The shock absorber according to claim 1, wherein the first pressing portion has a second rough surface or a second microstructure surface facing the first portion and in contact with the buffer element, or/and the second pressing portion has a third rough surface or a third microstructure surface facing the first portion and in contact with the buffer element.

7. The shock absorber according to claim 5, wherein the first pressing portion has a second rough surface or a second microstructure surface facing the first portion and in contact with the buffer element, or/and the second pressing portion has a third rough surface or a third microstructure surface facing the first portion and in contact with the buffer element.

8. A projection device, comprising a first optical machine casing, a second optical machine casing, a frame, a wheel, and a buffer element, wherein:
   the first optical machine casing comprises a first pressing portion;
   the second optical machine casing is detachably fixed to the first optical machine casing, and comprises a second pressing portion;
   the frame comprises a first portion and a second portion, and the first portion is located between the first pressing portion and the second pressing portion;
   the wheel is fixed to the second portion of the frame; and
   the buffer element is disposed between the first pressing portion and the first portion of the frame, and between the second pressing portion and the first portion of the frame, and the first pressing portion and the second pressing portion press against the buffer element to sandwich the first portion of the frame.

9. The projection device according to claim 8, wherein the first optical machine casing and the second optical machine casing together surround a space, and the first pressing portion, the second pressing portion, the frame and the wheel are located in the space.

10. The projection device according to claim 8, wherein the frame comprises a first opening located on the first portion, the first pressing portion comprises a protruding column, and the protruding column is covered by the buffer element and penetrates the first opening.

11. The projection device according to claim 10, wherein the second pressing portion comprises a second opening, and the protruding column extends into the second opening.

12. The projection device according to claim 8, wherein the buffer element comprises a first cushion and a second cushion, the first cushion is disposed between the first pressing portion and the first portion of the frame, and the second cushion is disposed between the second pressing portion and the first portion of the frame.

13. The projection device according to claim 8, wherein the first portion of the frame has a first rough surface or a first microstructure surface in contact with the buffer element.

14. The projection device according to claim 8, wherein the first pressing portion has a second rough surface or a second microstructure surface facing the first portion and in contact with the buffer element, or/and the second pressing portion has a third rough surface or a third microstructure surface facing the first portion and in contact with the buffer element.

15. The projection device according to claim 13, wherein the first pressing portion has a second rough surface or a second microstructure surface facing the first portion and in contact with the buffer element, or/and the second pressing portion has a third rough surface or a third microstructure surface facing the first portion and in contact with the buffer element.

16. The projection device according to claim 8, wherein the wheel comprises a color wheel or a fluorescent wheel.

* * * * *